United States Patent
Otake

(10) Patent No.: US 7,235,899 B2
(45) Date of Patent: *Jun. 26, 2007

(54) SWITCHING CONSTANT-CURRENT POWER SUPPLY SYSTEM

(75) Inventor: Tetsushi Otake, Tsurugashima (JP)

(73) Assignee: Toko, Inc., Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 10/791,921

(22) Filed: Mar. 3, 2004

(65) Prior Publication Data

US 2004/0183380 A1    Sep. 23, 2004

(30) Foreign Application Priority Data

Mar. 7, 2003    (JP) .............................. 2003-061591

(51) Int. Cl.
H02J 1/00     (2006.01)
H02J 3/00     (2006.01)

(52) U.S. Cl. ....................................... 307/82
(58) Field of Classification Search ................. 307/82; 327/95

See application file for complete search history.

(56) References Cited

U.S. PATENT DOCUMENTS

| | | | |
|---|---|---|---|
| 2,783,384 A | 2/1957 | Bright et al. | |
| 6,768,658 B2 * | 7/2004 | Perry | 363/65 |
| 6,909,249 B2 * | 6/2005 | Otake | 315/291 |

FOREIGN PATENT DOCUMENTS

| | | |
|---|---|---|
| JP | 53-78418 | 6/1978 |
| JP | 08126348 A | 5/1996 |
| JP | 10014236 A | 1/1998 |
| JP | 11069791 A | 3/1999 |
| JP | 11283772 A | 10/1999 |
| JP | 2000287460 A | 10/2000 |
| JP | 20000288990 A | 10/2000 |
| JP | 2001078451 A | 3/2001 |

\* cited by examiner

Primary Examiner—Stephen W. Jackson
Assistant Examiner—Carlos Amaya
(74) Attorney, Agent, or Firm—Cohen Pontani Lieberman & Pavane LLP

(57) ABSTRACT

Disclosed is a switching constant-current power supply system, comprising a feedback circuit 7 provided between a detector circuit 5 for generating a first feedback signal in proportion to a current flowing in a load 6, and a control circuit 4 for driving a first power converter circuit 3 which is provided on the input side of a second power converter circuit 10 to stabilize the load current. The feedback circuit 7 includes a signal hold section 8 for generating a second feedback signal. The feedback circuit 7 is operable to supply the first feedback signal to the control circuit 4 in a current supply period, and to supply the second feedback signal to the control circuit 4 in a current cutoff period. The second feedback signal has a signal value approximately equal to that of the first feedback signal appearing in the current supply period. The switching constant-current power supply system can stabilize the load current even under the condition that the load is repeatedly turned on/off.

8 Claims, 4 Drawing Sheets

(INTERMITTENT CONTROL SIGNAL)

SWITCHING CONSTANT-CURRENT POWER SUPPLY SYSTEM

FIELD OF THE INVENTION

The present invention relates to a switching power supply system for supplying a stable AC current or pulsed current to a load to be repeatedly turned on/off.

BACKGROUND OF THE INVENTION

In recent years, a light-emitting diode (hereinafter referred to as "LED") is increasingly used as a light source of backlight for liquid-crystal display (LCD) monitors.

There have been known various systems of a power supply circuit for supplying a drive current to a load including LED. In terms of the form of output currents, LED-driving power supply circuits can be roughly classified into a circuit for supplying a constant DC current, a circuit for supplying an AC current and a circuit for supplying a pulsed current.

A power supply circuit applying the operation principle of a Royer oscillation circuit and having a push-pull circuit (hereinafter referred to as "Royer-type power supply circuit") is known as one of means for obtaining an AC or pulsed current. The Royer oscillation circuit is disclosed in Japanese Patent Publication No. 32-4066. This Royer-type power supply circuit has two advantages: one capability of obtaining a simple circuitry, and the other capability of utilizing resonance to obtain an AC voltage analogous to sine wave. In view of these advantages, a Royer-type power supply circuit is widely used as self-oscillated inverters.

However, there are few case that a function of maintain an output current at a constant value or a function of changing the value of an output current is added to a Royer-type power supply circuit itself, for the following reason. In case of utilizing resonance, it is requited to set a resonance frequency and a switching frequency at the same value, which causes difficulties in accurately adjusting an output current as in a PWM control for changing an on-duty of a transistor.

Thus, in order to stabilize a current to be supplied from a Royer-type power supply circuit to a load, a converter circuit having a function of controlling a DC output voltage has been provided on the input side of the Royer-type power supply circuit, as shown in FIG. 1. This converter circuit is operable to control a voltage to be supplied to the Royer-type power supply circuit so as to indirectly control an AC or pulsed current to be supplied from the Royer-type power supply circuit to a load.

The above circuit will be briefly described with reference to FIG. 1. In FIG. 1, the reference numeral 1 indicates an input terminal for receiving a power from an external power source, such as a battery. The reference numerals 2a and 2b indicate output terminals for supplying a current to a load 6 with a plurality of LEDs which is connected therebetween. First and second power converter circuits 3, 10 are connected in series between the input terminal 1 and one of the output terminals 2a. The first power converter circuit 3 includes a choke coil L1, a switching transistor Q1, a rectifier diode D1, and a smoothing capacitor C1, which are connected with each other to form a step-up type converter. The second power converter circuit 10 includes transistors Q11, Q12, a capacitor C21, resistors R21, R22, and a transformer T, which are connected with each other to form a Royer-type power supply circuit.

A detector circuit 5 is connected between the other output terminal 2b and the ground serving as a reference voltage point, to detect a current flowing through a load (hereinafter referred to as "load current") so as to generate a feedback signal in proportion to the load current. A control circuit 4 is connected between the first power converter circuit 3 and the detector circuit 5, to drive the first power converter circuit 3 in response to the feedback signal received from the detector circuit 5.

The combination of the first power converter circuit 3, the control circuit 4, the second power converter circuit 10 and the detector circuit 5 makes up a switching constant-current power supply system for supply a given current to the load 6.

The operation of the switching constant-current power supply system in FIG. 1 will be briefly described below. The control circuit 4 is operable to control the on/off action of the switching transistor Q1 with an on-duty in proportion to the feedback signal from the detector circuit 5. In conjunction with the on-off action of the switching transistor Q1, a current flows in the smoothing capacitor C1 through the rectifier diode D1, and a DC voltage appears between the terminals of the smoothing capacitor C1. The DC voltage appearing between the terminals of the smoothing capacitor C1 becomes an output voltage of the first power converter circuit 3.

In response to the output voltage supplied from the first power converter circuit 3, the second power converter circuit 10 self-oscillates to generate an alternative voltage in the secondary winding thereof. The alternative voltage generated in the secondary winding allows a pulsed current having a half-wave rectified waveform to flow in the load 6.

The feedback signal generated at the detector circuit 5 has a value in proportion to the current flowing through the load 6. Thus, the switching transistor Q1 is turned on/off with an on-duty in proportion to the value of the load current to allow the voltage between the terminals of the smoothing capacitor C1 to have a value in proportion to that of the load current. For example, if the load current is lower than a target value for stabilization, the voltage between the terminals of the smoothing capacitor C1 will be increased. In this case, the value of a current to be supplied from the second power converter circuit 10 to the load 6 is determined by the DC voltage to be supplied to the second power converter circuit 10 or the voltage between the terminals of the smoothing capacitor C1. Thus, the load current, which is lower than the stabilization target value, is led to have an increased value in response to increase in the voltage between the terminals of the smoothing capacitor C1. According to the above control process, the circuit in FIG. 1 can stabilize the load current flowing through the load 6.

In view of a stable self-oscillation in the second converter circuit 10 having a push-pull circuit, it is desired to allow both forward/backward currents to flow through the secondary winding N2. However, LED incorporated in the load 6 permits a current to flow therethrough in the only one direction. Thus, in case where a Royer-type power supply circuit is used to supply a current to a load 6 including LED, it is necessary to take some measure such that as a dummy circuit is provided in parallel to the load 6 to flow a current in a direction opposite to the forward direction of the LED, or a load 6 is designed to have a plurality of LED arrays having opposite forward directions, as shown in FIG. 2.

The descriptions of the dummy circuit and the retrodirective LED arrays are omitted because the important point in the operation of the circuit in FIG. 1 is the circuit section for implementing the current detection. The following description on another circuit will be made in the same way.

In a part of display devices/lighting devices using LED as a light source, the LED is repeatedly turned on/off at a visibly incognizable speed to adjust the brightness of a display screen (hereinafter referred to as "dimming"). Such a display device/lighting device inevitably has a period where a current flows through LED (hereinafter referred to as "current supply period") and another period where no current flows through LED (hereinafter referred to as "current cutoff period"). Thus, in a switching constant-current power supply system where a power supply circuit for supplying a current to LED is constructed as shown in FIG. 1, the feedback signal to be supplied from the detector circuit 5 to the control circuit 4 becomes approximately zero in a current cutoff period caused by the on/off switching of the load.

In the power supply system illustrated in FIG. 1, a current flowing through the load 6 has a pulse waveform which causes a period where no current flows between pulses (hereinafter referred to as "pulse interval period"). On the other hand, the switching transistor Q1 has approximately the same switching frequency (several hundred kHz) as those of the transistors Q11, Q12. Under these conditions, even if the value of the feedback signal becomes zero in a pulse interval period, the relationship with a response speed of the feedback control system allows the control circuit 4 and the first power converter circuit 3 to be operated in the same manner as that in the period where the value of the feedback signal is not zero.

In contrast, the frequency of the on/off switching (hereinafter refereed to as "intermittence") of LED is incredibly low as compared to the switching frequency of the power converter circuit. The actual intermittent frequency is about several hundred Hz. Thus, in terms of the phenomenon that the feedback signal becomes zero, the current cutoff period is in a different situation from the pulse interval period. Specifically, the control circuit 4 acts to maximize the on-duty of the switching transistor Q1 in the current cutoff period, and then reduce the on-duty of the switching transistor Q1 in the current supply period. In this process, the maximized on-duty in the current cutoff period causes undesirable sharp increase in the voltage between the terminals of the smoothing capacitor C1, and then a load current higher than the stabilization target value undesirably flows in the current supply period which is relatively long.

For example, as one of measures for such an unstable load current, it is contemplated to subject the feedback signal to smoothing using a capacitor having a relatively large capacity and then supply the smoothed signal to the control circuit 4. However, if a high-capacity capacitor capable of maintaining the feedback signal at a significant value is provided, the feedback signal under a processing of the control circuit 4 will be kept at a value approximately equal to an average value for a relatively long time of period. Thus, if the load current is changed due to a different factor from the intermittence, the load current deviated from the stabilization target value cannot be quickly returned to the target value. As a result, due to a different factor from the current cutoff period, the load current will be undesirably destabilized.

As above, under the condition that a load is repeatedly intermitted, a response speed of the control operation in the feedback loop of the control circuit 4-the switching transistor Q1-the smoothing capacitor C1-the second power converter circuit 10-the load 6-the detector circuit 5-the control circuit 4 cannot be likely to keep up with change in the load, resulting in out of control in the stabilization of the load current.

SUMMARY OF THE INVENTION

In view of the above circumstances, it is an object of the present invention to provide a switching constant-current power supply system capable of stabilizing a load current even under the condition that a load is repeatedly intermitted.

In order to achieve the above object, the present invention provides a switching constant-current power supply system including a switching-type first power converter circuit operable, in response to supply of power from an external power source, to generate a stable DC voltage, a second power converter circuit capable of functioning as a DC-AC converter and operable, in response to supply of the DC voltage, to supply an AC or pulsed current to a load, a current detector circuit for generating a feedback signal in proportion to a load current; and a control circuit for controlling the operation of the first power converter circuit according to the feedback signal. The switching constant-current power supply system comprises a feedback circuit provided between the current detector circuit and the control circuit. The feedback circuit includes a signal hold section for holding a signal. The feedback circuit is operable to supply either one of a first feedback signal generated from the current detector circuit and a second feedback signal generated from the signal hold section, wherein the second feedback signal has approximately the same signal value as that of the first feedback signal at a certain time point.

More specifically, the present invention may be achieved in the following manner.

The fundamental part of a switching constant-current power supply system is comprised of a current detector circuit for generating a feedback signal in proportion to a lead current, a second power converter circuit for supplying an AC or pulsed current to a load, a first power converter circuit for supplying a given DC voltage to the second power converter circuit, and a control circuit for driving the first power conversion circuit according to a feedback signal from the detection circuit. Then, as a substantial part of the present invention, a feedback circuit is provided between the current detector circuit and the control circuit. The feedback circuit includes a signal hold section for holding a signal. The feedback circuit is operable to supply a first feedback signal generated from the current detector circuit to the control circuit in a current supply period and to supply a second feedback signal generated from the signal hold section to the control circuit in a current cutoff period.

The feedback circuit for achieving the above function may be generally comprised of a select section and signal hold section. Specifically, the signal hold section is comprised of a peak hold circuit and a reset circuit.

This peak hold circuit is operable to refer to the first feedback signal from the detector circuit and then generate the second feedback signal approximately equal to a maximum value of the first feedback signal appearing in the current supply period. The reset circuit is operable to allow the peak hold circuit to be returned to its initial state when a signal synchronous with the intermittence of the load exhibits a given change or when the change from the state where no load current flows to the state where the load current flows is detected from the first feedback signal.

According to the switching constant-current power supply system incorporating the above feedback circuit, in the current supply period, the first feedback signal is supplied from the feedback circuit to the control circuit. Thus, in the current supply period, the switching constant-current power supply system internally performs an operation of stabilizing the load current in the same manner as that in the conventional circuit.

In the current cutoff period, the second feedback signal is supplied from the feedback circuit to the control circuit. In this period, the control circuit is operable to set the on-duty of a switching element provided in the first power conversion circuit at approximately the same value as that when a maximum load current flows in the immediately preceding current supply period.

The above construction and operations can prevent the occurrence of a disadvantageous phenomenon that the switching constant-current power supply system cannot stabilize the load current under the load is intermitted.

DESCRIPTION OF THE PREFERRED EMBODIMENT

Figure 3:
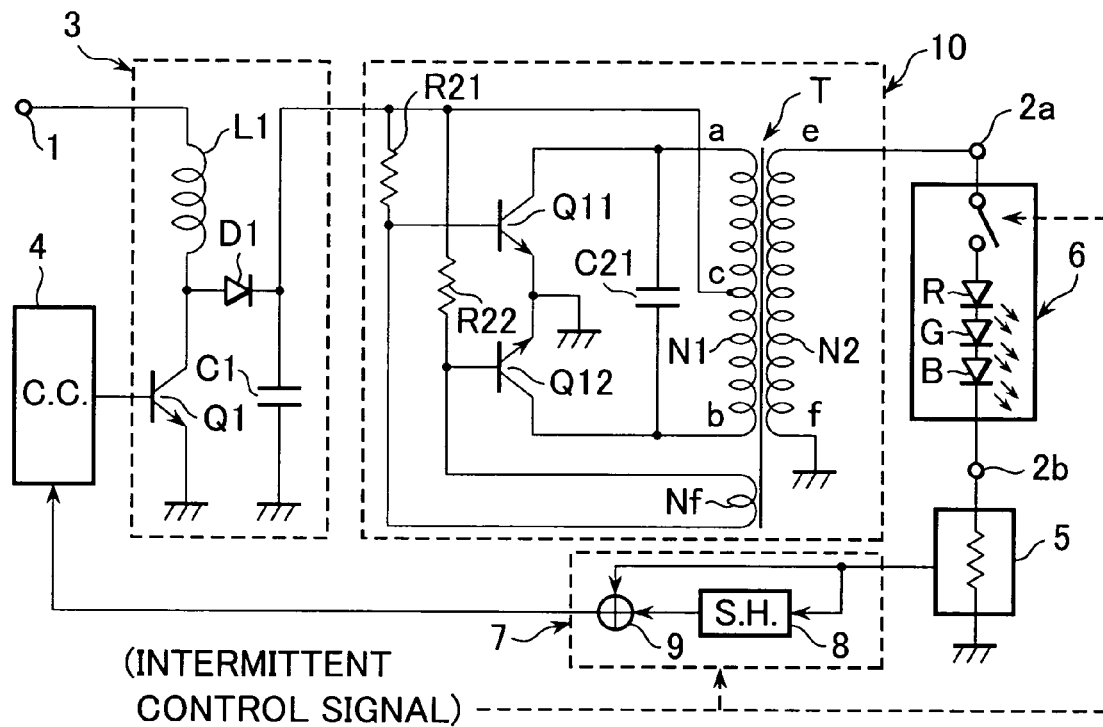
FIG. 3 is a block diagram showing a switching constant-current power supply system according to one embodiment of the present invention.

FIG. 3 is a block diagram showing a switching constant-current power supply system according to one embodiment of the present invention.

Figure 1:
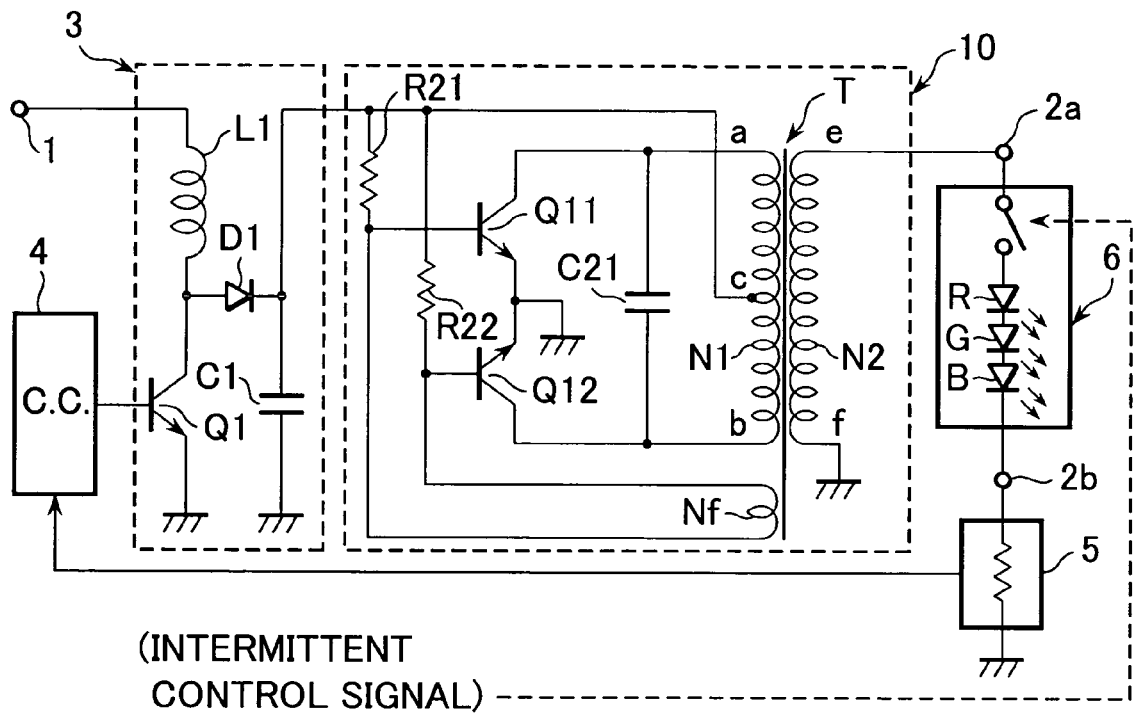
FIG. 1 is a block diagram showing one example of a conventional switching constant-current power supply system.
Figure 2:
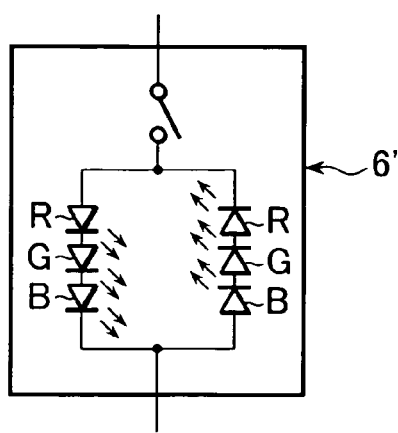
FIG. 2 is a circuit diagram showing one example of a load including LED compatible with an AC current.

Except for providing a feedback circuit 7 between the control circuit 4 and the detector circuit 5, the construction of the switching constant-current power supply system in FIG. 3 is the same as that of the conventional circuit in FIG. 1. The feedback circuit 7 illustrated in FIG. 3 comprises a signal hold section 8 for generating a second feedback signal, and a select section 9 for supplying either one of a first feedback signal generated from the detection circuit 5 and the above second feedback signal.

Figure 4:
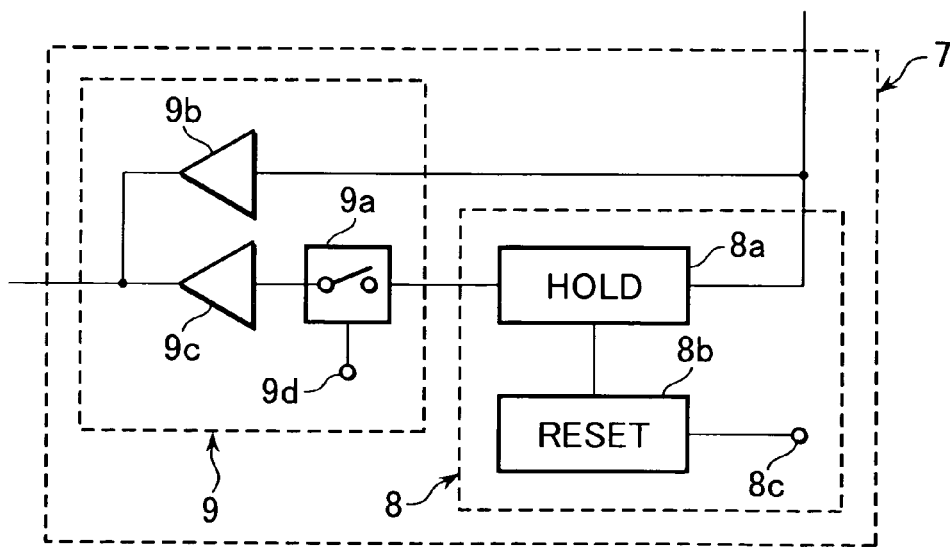
FIG. 4 is a block diagram showing a first example of a feedback circuit as a substantial part of the present invention.

In this embodiment, the feedback circuit is specifically constructed as shown in FIG. 4.

In FIG. 4, respective input terminals of a peak hold circuit 8a and a first buffer circuit 9b are connected to the detector circuit 5 to receive the first feedback signal.

An output terminal of the peak hold circuit 8a is connected to an input terminal of a second buffer circuit 9c through a switch circuit 9a, and a control terminal of the peak hold circuit 8a is connected to an output terminal of a reset circuit 8b. Respective output terminals of the buffer circuits 9b, 9c are connected to a feedback-signal input terminal of the control circuit 4. Respective control terminals of the reset circuit 8b and the switch circuit 9a are connected to a signal terminal 8c or a signal terminal 9d to allow an intermittence control signal for intermitting a load current of a load 6 to be entered thereinto.

The feedback circuit 7 constructed as above operates in response to the intermittence control signal supplied from outside and the first feedback signal supplied from the detector circuit 5.

When the intermittence control signal is a first state, a certain load current flows in the load 6, and the switch circuit 9a goes into its OFF state. In this current supply period, the first feedback signal is supplied to the control circuit 4 through the first buffer circuit 9b.

In conjunction with this operation, the peak hold circuit 8a refers to the first feedback signal generated from the detector circuit 5, and then generates the second feedback signal approximately equal to a maximum value (peak value) of the first feedback signal.

When the intermittence control signal is changed into a second state, no load current flows in the load 6, and the switch circuit 9a goes into its ON state. In this current cutoff period, the second feedback signal is supplied to the control circuit 4 through the switch circuit 9a and the second buffer circuit 9c.

Then, when the intermittence control signal is changed from the second state to the first state, the reset circuit 8b detects the state change in accordance with the change of the intermittence control signal, and then returns the peak hold circuit 8a to its initial state. Thus, the peak hold circuit 8a generates the second feedback signal approximately equal to a maximum (peak value) of the first feedback signal generated in a new current supply period.

According to the switching constant-current power supply system in FIG. 3 which has the feedback circuit 7 as shown in FIG. 4, in a current supply period where a load current flows, a first feedback signal is supplied from the detector circuit 5 to the control circuit 4. In this period, the system in FIG. 3 performs an operation of stabilizing the load current in the same manner as that in the conventional circuit in FIG. 1.

In a current cutoff period where no load current flows, a second feedback signal generated from the peak hold circuit 8a is selectively supplied to the control circuit 4. The control circuit 4 receiving the second feedback signal sets the on-duty of the switching transistor Q1 at a given (fixed) value. In this operation, the on-duty becomes approximately equal to a value when a maximum load current flows in an immediately preceding current supply period.

Then, when the on-duty of the switching transistor Q1 is fixed, the voltage between the terminals of the smoothing capacitor C1 is prevented from increasing in the current cutoff period. This suppresses a disadvantageous phenomenon that a load current higher than a target value flows in the subsequent current supply period. Further, the on-duty of the switching transistor in the current cutoff period has approximately the same value as that when a current is actually supplied to the load 6. Thus, when the state where no load current flows is changed into the state where a certain load current flows, the feedback-loop control operation is quickly activated.

Through the above operation, the load current can be stabilized even under the condition that the load is repeatedly turned on/off.

Figure 5:
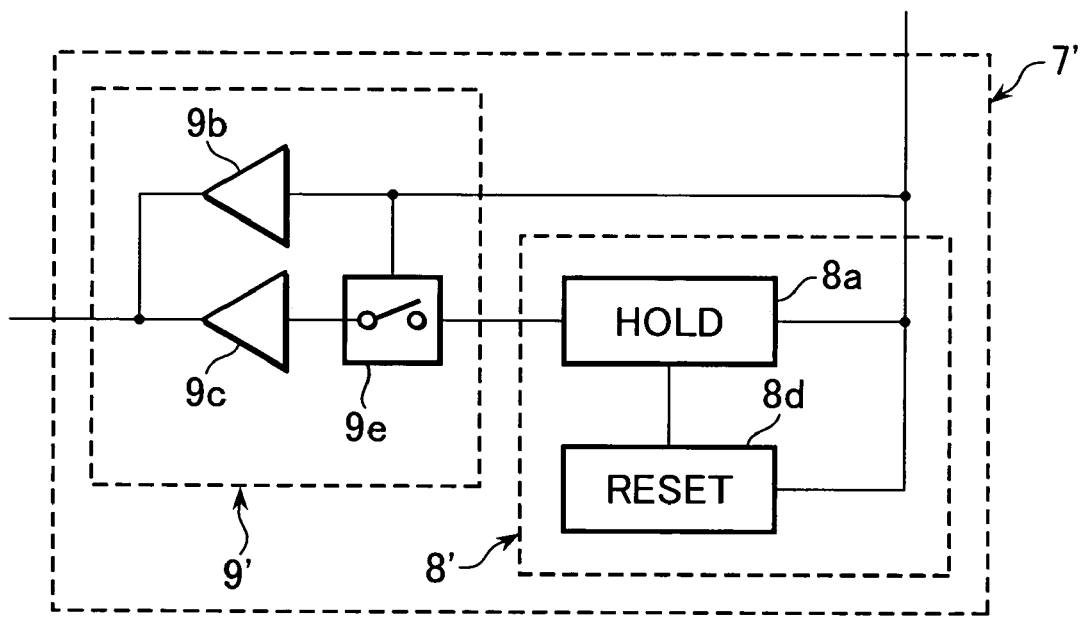
FIG. 5 is a block diagram showing a second example of a feedback circuit as a substantial part of the present invention.

The feedback circuit 7 may be constructed as shown in FIG. 5.

While the feedback circuit 7 in FIG. 3 is designed such that the reset circuit 8b and the switch circuit 9a operate according to an intermittence control signal supplied thereto, respectively, through the signal terminal 8c and the signal terminal 9d, a feedback circuit 7' is designed such that a reset circuit 8*d* and a switch circuit 9*e* operate according to the state of the first feedback signal to be supplied from the detect circuit 5.

The feedback circuit 7' in FIG. 5 can achieve the same operation as that of the feedback circuit 7 in FIG. 4. However, in the feedback circuit 7' in FIG. 5, the resent circuit 8*d* and the switch circuit 9*e* is required to have some measure for preventing wrong operations otherwise likely to occur in the state when the value of the feedback signal becomes zero in a pulse interval period, for example the insertion of minute capacitance or the use of a circuit element having a low operation speed.

Figure 6:
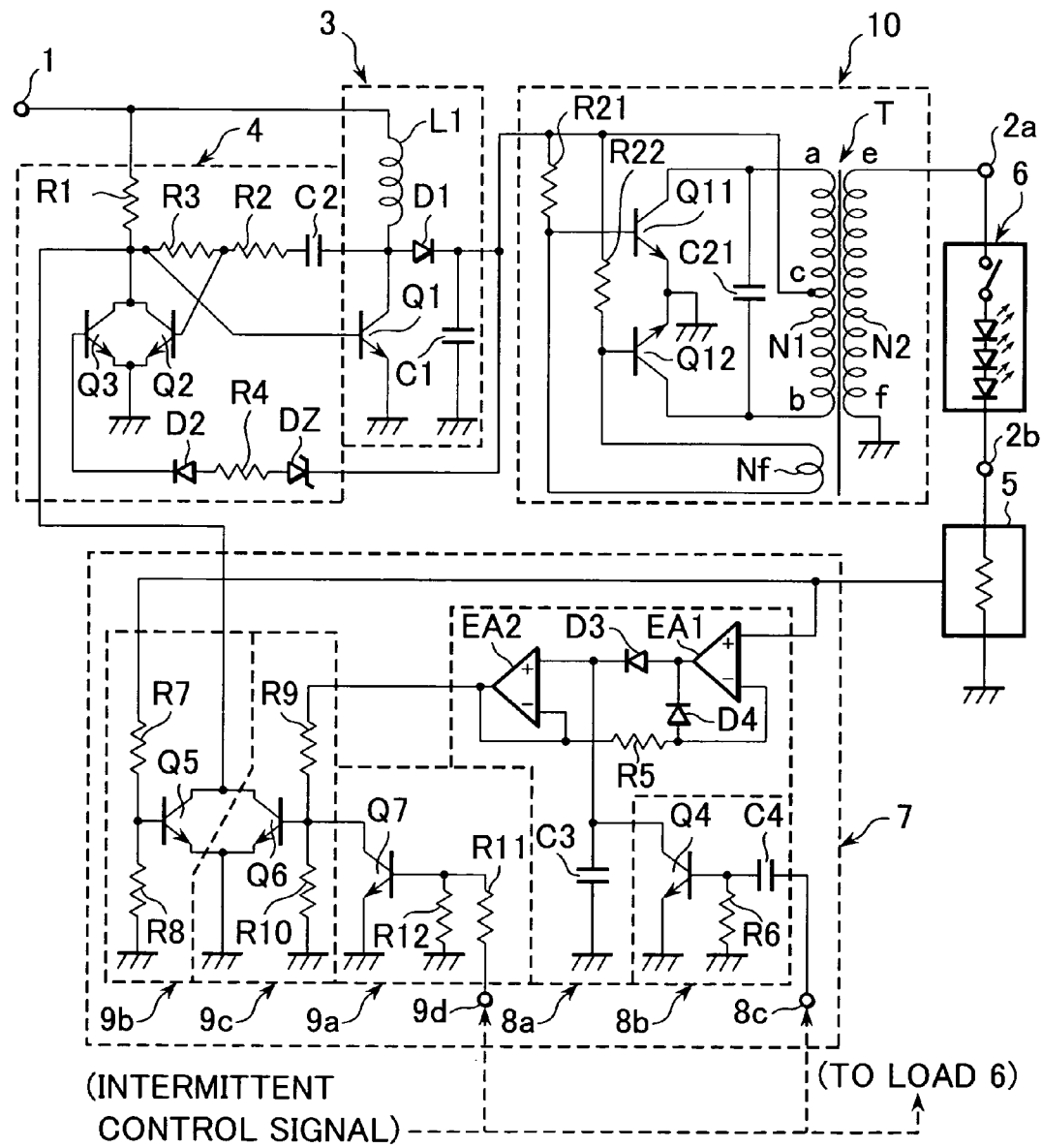
FIG. 6 is a specific circuit diagram achieving the switching constant-current power supply system in FIG. 3.

FIG. 6 is a specific circuit diagram achieving the switching constant-current power supply system of the present invention as shown by the block diagram in FIG. 3.

In the circuit diagram illustrated in FIG. 6, the circuitry and self-oscillating operation of the power converter circuit 3 including a control circuit 4 are approximately the same as those disclosed in Japanese Patent Laid-Open Publication Nos. 10-14236, 11-69791 and 12-287460 and in Japanese Utility Model Laid-Open Publication No. 53-78418. Further, the circuitry and self-oscillating operation of the power conversion circuit 10 having a DC-AC converter function are approximately the same as those disclosed in Japanese Patent Laid-Open Publication No. 8-126348.

In the circuit diagram illustrated in FIG. 6, a feedback circuit 7 as a substantial part of the present invention is constructed as follows.

Two error amplifiers EA1, EA2 are employed. An output terminal of the error amplifier EA1 is connected to a non-inversion input terminal (+) of the error amplifier EA2 through a diode D3. A capacitor C3 is connected between the non-inversion input terminal (+) of the error amplifier EA2 and the ground, and an inversion input terminal (−) thereof is connected to an output terminal of the error amplifier EA2. A diode D4 is connected between an inversion input terminal (−) and an output terminal of the error amplifier EA1, and a resistor R5 is connected between an inversion input terminal (−) of the error amplifier EA1 and the output terminal of the error amplifier EA2. A non-inversion input terminal (+) of the error amplifier EA1 is connected to a detection circuit 5.

The combination of the error amplifiers EA1, EA2, the diodes D3, D4, the resistor R5 and capacitor C3 makes up a peak hold circuit 8*a*. The construction of the peak hold circuit is disclosed in Japanese Patent Laid-Open Publication No 2000-288990.

The collector of a transistor Q4 is connected to the node of the capacitor C3 and the error amplifier EA2, and the emitter of the transistor Q4 is connected to the ground. The base of the transistor Q4 is connected to a signal input terminal 8*c* through a capacitor C4, and a resistor R6 is connected between the base and emitter of the transistor Q4. The combination of the capacitor C4, the resistor R6 and the transistor Q4 makes up a reset circuit 8*b*.

A resister R7 and a resister R8 are connected in series between the detector circuit 5 and the ground, and the node of the resisters R7, R8 is connected to the base of a transistor Q5. The emitter and the collector of the transistor Q5 are connected to the ground and the collector of a transistor Q2 of the control circuit 4, respectively. The combination of the register R7, the register R8, and the transistor Q5 makes up a first buffer circuit 9*b*.

A resister R9 and a resister R10 are connected in series between the output terminal of the error amplifier EA2 and the ground, and the node of the resisters R9, R10 is connected to the base of a transistor Q6. The emitter and the collector of the transistor Q6 are connected to the ground and the collector of the transistor Q2 of the control circuit 4, respectively. The combination of the register R9, the register R10, and the transistor Q6 makes up a second buffer circuit 9*c*.

Then, the collector of a transistor Q7 is connected to the base of the transistor Q6, and the emitter of the transistor Q7 is connected to the ground. The base of the transistor Q7 is connected to a signal input terminal 9*d* through a resistor R11, and a resistor R12 is connected between the base and emitter of the transistor Q7. The combination of the resistor R11, the resistor R12, and the transistor Q7 makes up a switch circuit 9*a*.

According to the circuit illustrated in FIG. 6 and constructed as above, in a current supply period, a first feedback signal generated from the detector circuit 5 has a value in proportion to a load current.

In this period, the transistor Q7 is turned on by an intermittence control signal supplied through the signal input terminal 9*b*, and the transistor Q6 is turned off. Thus, a current in proportion to a first feedback signal flows into the collector of the transistor Q5. In this manner, the switching transistor Q1 is turns on and off with an on-duty in proportion to the first feedback signal.

Simultaneously, the error amplifier EA1 of the peak hold circuit 8*a* charges the capacitor C3 in proportion to the value of the first feedback signal supplied from the detector circuit 5. Then, the error amplifier EA2 generates a second feedback signal in proportion to a voltage appearing between the terminals of the capacitor C3. In this operation, the capacitor C3 is charged by the error amplifier EA1 only when the first feedback signal becomes greater than the second feedback signal, because the output of the error amplifier EA2 is connected to the inversion input terminal (−) of the error amplifier EA1. Thus, the second feedback signal has a value approximately equal to a maximum value of the first feedback signal generated in the current supply period.

In a current cutoff period, the value of a first feedback signal generated from the detector circuit 5 becomes approximately zero. In this period, the transistor Q5 is turned off. Further, in response to change in the state of the intermittence control signal, the transistor Q7 is turned off, and the transistor Q6 is turned on. Thus, a current flows from the control circuit 4 into the collector of the transistor Q6 in proportion to the second feedback signal. In this manner, the switching transistor Q1 is turned on and off with an on-duty in proportion to the second feedback signal.

The capacitor C4 of the resent circuit 8*b* and the resister R6 are equivalently configured as a differentiation circuit. Thus, when the intermittence control signal is changed stepwise during transition from the current cutoff period to the current supply period, the transistor Q4 with the base connected to the node of the capacitor C4 and the resister R6 is immediately turned on. Then, the capacitor C3 is discharged through the transistor Q4, and thus the peak hold circuit 8*a* is returned to its initial state.

As above, the circuit illustrated in FIG. 6 can achieve the switching constant-current power supply system as shown by the block diagram in FIG. 3, and the obtained power supply system can stabilize a load current even under the condition that the load is repeatedly turned on and off.

While the signal hold section 8 of the feedback circuit 7 in the above embodiment is comprised of the peak hold circuit 8*a* and the reset circuit 8*b*, the present invention is not limited thereto. For example, the signal hold section 8 may be comprised of a sample hold circuit and a trigger circuit.

Further, instead of returning the peak hold circuit 8a to its initial state according to change in the intermittence control signal or the first feedback signal, the peak hold circuit 8a may be returned to its initial state using another periodical reset signal. In this case, any suitable reset signal to be supplied at a cycle equal to or greater than the intermittent cycle of the load. In an extreme case, the reset signal may be supplied in asynchronous with the intermittence of the load.

Furthermore, the first power converter circuit 3 is not limited to a step-up chopper type, and the control circuit 4 is not limited to a self-excited PWM type. In addition, any other suitable detection method may be used as the detector circuit 5 in place of the resistor-based detection, and additional amplifier circuit or level shift circuit may be employed to match the value of the first feedback signal with a required level.

It is understood that various modifications can be made without departing from the spirit and scope of the present invention.

What is claimed is:

1. A switching constant-current power supply system including:
    a switching-type first power converter circuit operable, in response to supply of power from an external power source, to generate a stable DC voltage;
    a second power converter circuit capable of functioning as a DC-AC converter and operable, in response to supply of said DC voltage, to supply an AC or pulsed current to a load;
    a current detector circuit for generating a first feedback signal in proportion to a load current;
    a control circuit for controlling the operation of said first power converter circuit according to said first feedback signal so as to stabilize said load current; and
    a feedback circuit provided between said current detector circuit and said control circuit, said feedback circuit including a signal hold section for holding a signal, said feedback circuit being operable to supply the first feedback signal to the control circuit when the load current flows and to supply a second feedback signal to the control circuit when the load current does not flow, wherein said second feedback signal has a signal value approximately equal to that of said first feedback signal at a certain time point.

2. The switching constant-current power supply system as defined in claim 1, wherein said signal hold section provided in said feedback circuit is operable to refer to the first feedback signal at a certain time point when the load current flows, and then generate the second feedback signal approximately equal to said first feedback signal.

3. The switching constant-current power supply system as defined in claim 2, wherein said signal hold section includes a peak hold circuit, wherein said second feedback signal is approximately equal to a maximum value of said first feedback signal generated when the load current flows.

4. The switching constant-current power supply system as defined in claim 3, wherein said signal hold section further includes a reset circuit operable, in response to the change from the state where no load current flows to the state where the load current flows, to supply a signal for allowing said peak hold circuit to be returned to its initial state.

5. The switching constant-current power supply system as defined in claim 4, wherein said load includes a light-emitting diode to be turned on and off at a high speed, wherein said switching constant-current power supply system is operable, to supply a given current to said light-emitting diode when said light-emitting diode is in its ON state.

6. The switching constant-current power supply system as defined in claim 2, wherein said load includes a light-emitting diode to be turned on and off at a high speed, wherein said switching constant-current power supply system is operable, to supply a given current to said light-emitting diode when said light-emitting diode is in its ON state.

7. The switching constant-current power supply system as defined in claim 3, wherein said load includes a light-emitting diode to be turned on and off at a high speed, wherein said switching constant-current power supply system is operable, to supply a given current to said light-emitting diode when said light-emitting diode is in its ON state.

8. The switching constant-current power supply system as defined in claim 1, wherein the first feedback signal and the second feedback signal are supplied to the same single terminal of the control circuit on a complementary basis.

* * * * *